United States Patent
Cha et al.

(10) Patent No.: US 8,305,487 B2
(45) Date of Patent: Nov. 6, 2012

(54) METHOD AND APPARATUS FOR CONTROLLING MULTIPLE EXPOSURES

(75) Inventors: Joon-Hyuk Cha, Incheon (KR); Young Su Moon, Seoul (KR); Shi Hwa Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 369 days.

(21) Appl. No.: 12/662,438

(22) Filed: Apr. 16, 2010

(65) Prior Publication Data

US 2011/0090365 A1  Apr. 21, 2011

(30) Foreign Application Priority Data

Oct. 21, 2009  (KR) .......... 10-2009-0100156

(51) Int. Cl.
*G03B 7/00* (2006.01)
(52) U.S. Cl. ........ 348/362; 348/222.1; 396/96; 396/213
(58) Field of Classification Search ............ 348/362
See application file for complete search history.

(56) References Cited

U.S. PATENT DOCUMENTS

| | | | |
|---|---|---|---|
| 5,515,132 A * | 5/1996 | Iwasaki | 396/234 |
| 6,952,234 B2 | 10/2005 | Hatano | |
| 7,010,174 B2 | 3/2006 | Kang et al. | |
| 7,142,723 B2 | 11/2006 | Kang et al. | |
| 7,202,892 B1 | 4/2007 | Ogata et al. | |
| 7,239,805 B2 | 7/2007 | Uyttendaele et al. | |
| 2005/0264683 A1* | 12/2005 | Kamon et al. | 348/362 |
| 2005/0275747 A1* | 12/2005 | Nayar et al. | 348/362 |
| 2007/0009253 A1* | 1/2007 | Nikkanen et al. | 396/234 |
| 2007/0229698 A1 | 10/2007 | Kakinuma et al. | |

FOREIGN PATENT DOCUMENTS

| | | |
|---|---|---|
| JP | 2003-046857 | 2/2003 |
| JP | 2006-025122 | 1/2006 |
| JP | 2006-050541 | 2/2006 |
| JP | 2006-135601 | 5/2006 |
| JP | 2006-180015 | 7/2006 |
| JP | 2008-148180 | 6/2008 |
| KR | 10-2006-0108878 | 10/2006 |
| KR | 10-2007-0105028 | 10/2007 |
| KR | 10-2008-0104725 | 12/2008 |

OTHER PUBLICATIONS

Recovering High Dynamic Range Radiance Maps from Photographs, Paul E. Debevec and Jitendra Malik, SIGGRAPH, 1997.
Photographic Tone Reproduction for Digital Images, E. Reinhard, M. Stark, P. Shirley, and J. Ferwerda, ACM Transactions on Graphics, 2002.

* cited by examiner

*Primary Examiner* — Sinh Tran
*Assistant Examiner* — Paul Berardesca
(74) *Attorney, Agent, or Firm* — Staas & Halsey LLP

(57) ABSTRACT

Provided is a multi-exposure controlling method and apparatus. An exposure control unit may set an initial exposure time based on a comparison result between a predetermined brightness confidence interval and an average high brightness that is calculated based on at least one current histogram. A comparison unit may compare the brightness confidence interval and an average low brightness that is calculated based on a subsequent histogram obtained by photographing a subject using the set initial exposure time. The exposure control unit may change the initial exposure time based on a comparison result of the comparison unit.

24 Claims, 7 Drawing Sheets
(3 of 7 Drawing Sheet(s) Filed in Color)

METHOD AND APPARATUS FOR CONTROLLING MULTIPLE EXPOSURES

CROSS-REFERENCE TO RELATED APPLICATIONS

This application claims the benefit of Korean Patent Application No. 10-2009-0100156, filed on Oct. 21, 2009, in the Korean Intellectual Property Office, the disclosure of which is incorporated herein by reference.

BACKGROUND

1. Field

One or more embodiments relate to a method and apparatus that may photograph a dynamic range image using a digital imagining device, and more particularly, to a method and apparatus for controlling multiple exposures that may obtain multi-frame images utilized to photograph a high dynamic range image.

2. Description of the Related Art

A dynamic range indicates a brightness range of light that a picture photographed using a camera may express. An actual dynamic range of a digital photographing device is significantly smaller than a dynamic range of a human being. Accordingly, an image obtained using the digital photographing device may have a deteriorated expression compared to an image visible by the human being. For example, when a high contrast scene having a high dynamic range (HDR) is photographed, such as a case where a subject is photographed in backlight, a portion beyond the dynamic range of the digital photographing device may be expressed in zero corresponding to black or in 255 corresponding to white, based on an 8-bit image. Accordingly, a screen quality of a scene having an HDR may be deteriorated and be expressed to be different from the scene viewed by eyes of the human being.

A method of obtaining an HDR image by matching a plurality of images obtained by photographing a subject at different exposures is utilized. However, in the above method, a user may photograph the subject by manually setting the exposures to obtain the plurality of images, or may photograph the subject at predetermined exposure values using a digital camera to obtain two or three images. Accordingly, it may be difficult to perfectly express a dynamic range of a scene desired to be photographed.

SUMMARY

Additional aspects and/or advantages will be set forth in part in the description which follows and, in part, will be apparent from the description, or may be learned by practice of the invention.

According to an aspect of one or more embodiments, there may be provided an apparatus for controlling multiple exposures, the apparatus including an exposure control unit to set an initial exposure time based on a comparison result between a predetermined brightness confidence interval and an average high brightness that is calculated based on at least one current histogram, and a comparison unit to compare the brightness confidence interval and an average low brightness that is calculated based on a subsequent histogram obtained by photographing a subject using the set initial exposure time. The exposure control unit may change the initial exposure time based on a comparison result of the comparison unit.

When the average low brightness is excluded from the brightness confidence interval, the exposure control unit may increase an exposure time by a set exposure value to re-photograph the subject.

The brightness confidence interval may be selected from a response function that is a relationship function between a brightness of at least one pixel and an exposure time.

The brightness confidence interval may include a linear interval of the response function.

A difference between exposure times corresponding to both ends of the linear interval may indicate an exposure value.

When the average low brightness is included in the brightness confidence interval, the exposure control unit may terminate a multi-exposure photographing operation.

The apparatus may further include a first calculator to calculate an average brightness of pixels corresponding to a high brightness area in the at least one current histogram, and to set the calculated average brightness as the average high brightness, and a second calculator to calculate an average brightness of pixels corresponding to a low brightness area in the subsequent histogram, and to set the calculated average brightness as the average low brightness.

The first calculator may select, from the high brightness area, a brightness level of pixels corresponding to a first ratio among all pixels, and calculates an average brightness of the selected pixels. The second calculator may select, from the low brightness area, a brightness level of pixels corresponding to a second ratio among all the pixels, and calculates an average brightness of the selected pixels.

The exposure control unit may set the initial exposure time by controlling an exposure so that the average high brightness is included in the brightness confidence interval.

The exposure control unit may set, as the initial exposure time, an exposure time of when the average high brightness is closer to an intermediate brightness of the brightness confidence interval.

When the at least one current histogram includes a histogram with respect to a red (R) channel, a histogram with respect to a green (G) channel, and a histogram with respect to a blue (B) channel, the exposure control unit may compare the brightness confidence interval and a greatest (relatively great) average high brightness among high brightness averages calculated based on the histograms of the R channel, the G channel, and the B channel.

According to another aspect of one or more embodiments, there may be provided a method of controlling multiple exposures, the method including setting an initial exposure time based on a comparison result between a predetermined brightness confidence interval and an average high brightness that is calculated based on at least one current histogram, comparing the brightness confidence interval and an average low brightness that is calculated based on a subsequent histogram obtained by photographing a subject using the set initial exposure time, and changing the initial exposure time based on a comparison result.

When the average low brightness is excluded from the brightness confidence interval, the changing may include increasing an exposure time by a set exposure value to re-photograph the subject.

The method may further include terminating a multi-exposure photographing operation when the average low brightness is included in the brightness confidence interval.

The method may further include calculating an average brightness of pixels corresponding to a high brightness area in the at least one current histogram to set the calculated average brightness as the average high brightness, and calculating an average brightness of pixels corresponding to a low brightness area in the subsequent histogram to set the calculated average brightness as the average low brightness.

The calculating and the setting the average high brightness may include selecting, from the high brightness area, a brightness level of pixels corresponding to a first ratio among all pixels, and calculating an average brightness of the pixels.

The calculating and the setting the average low brightness may include selecting, from the low brightness area, a brightness level of pixels corresponding to a second ratio among all the pixels, and calculating an average brightness of the pixels.

The setting of the initial exposure time may include setting the initial exposure time by controlling an exposure so that the average high brightness is included in the brightness confidence interval.

The setting of the initial exposure time may include setting, as the initial exposure time, an exposure time of when the average high brightness is closest to an intermediate brightness of the predetermined brightness confidence interval.

When the at least one current histogram includes a histogram with respect to an R channel, a histogram with respect to a G channel, and a histogram with respect to a B channel, the setting of the initial exposure time may include comparing the brightness confidence interval and a greatest (relative great) average high brightness among high brightness averages calculated based on the histograms of the R channel, the G channel, and the B channel.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and/or other aspects and advantages will become apparent and more readily appreciated from the following description of the exemplary embodiments, taken in conjunction with the accompanying drawings of which.

DETAILED DESCRIPTION

Figure 1:
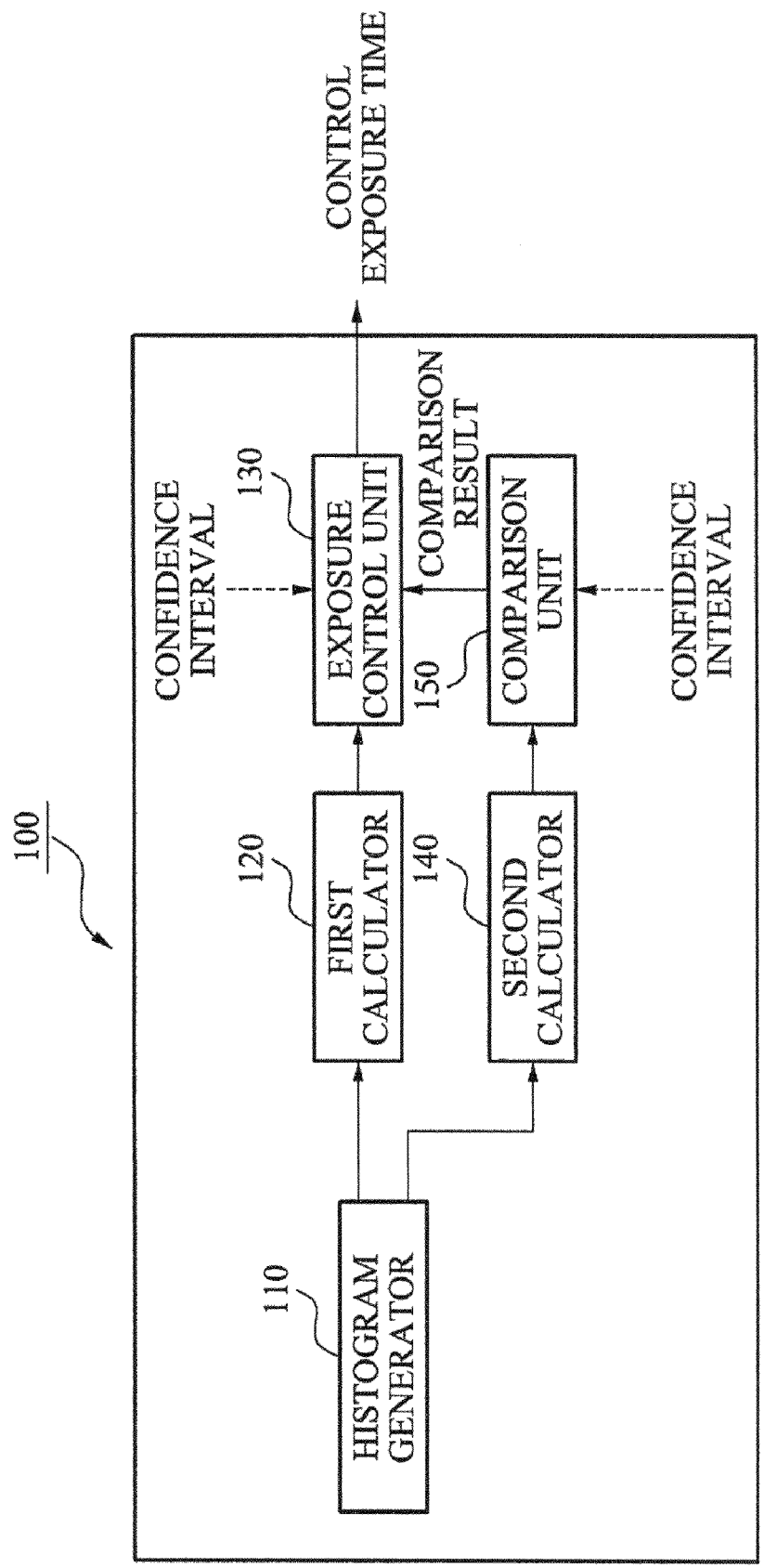
FIG. 1 illustrates an apparatus of controlling multiple exposures according to an embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 illustrates an apparatus 100 of controlling multiple exposures according to an embodiment.

When a digital photographing device (not shown) desires to obtain a high dynamic range (HDR) image, the multi-exposure controlling apparatus 100 enables the digital photographing device to obtain the HDR image using a minimum (or relatively low) number of photographing operations. For example, the digital photographing device may include a device having a digital camera function or a digital camcorder function.

The multi-exposure controlling apparatus 100 may include a histogram generator 110, a first calculator 120, an exposure control unit 130, a second calculator 140, and a comparison unit 150.

The histogram generator 110 may generate a histogram with respect to at least one input image. The histogram may be variously generated into, for example, a saturation histogram, a brightness histogram, and the like, based on a type of an image. For example, when the type of the image is a red, green, blue (RGB) image, the histogram generator 110 may generate the brightness histogram. When the type of the image is a black and white image, the histogram generator 110 may generate the saturation histogram.

The first calculator 120 may calculate an average brightness of pixels corresponding to a high brightness area, for example, top A % in the histogram generated by the histogram generator 110, and may set the calculated average brightness as an average high brightness. Hereinafter, a histogram with the calculated average brightness is referred to as a current histogram, and a histogram of a re-photographed image is referred to as a subsequent histogram.

The first calculator 120 may select, from a high brightness area of the current histogram, a brightness level of pixels corresponding to a first ratio, for example, top A % among all pixels, and may calculate an average brightness of the selected pixels. The first calculator 120 may select, from the histogram, a brightness level corresponding to the top A %. The first calculator 120 may set the calculated brightness level as the average high brightness.

For example, when a number of all the pixels is 100 and the first ratio is 10%, the first calculator 120 may select, in a descending order from the high brightness area of the histogram, a brightness level of 100×0.1=10 pixels. The first calculator 120 may calculate an average brightness level of the selected top 10 pixels and set the calculated average brightness level as the average high brightness.

The first ratio may be set in a setting or manufacturing operation of the multi-exposure controlling apparatus 100, and may be changed according to a user manipulation.

Hereinafter, a brightness confidence interval utilized in an exposure control unit according to an embodiment will be described with reference to FIG. 2.

The brightness confidence interval (hereinafter, a confidence interval) may be selected from a response function that is a relationship function between a pixel brightness and an exposure time. A designer may measure a brightness of at least one pixel included in a test image, and may verify a brightness change with changing the exposure time.

Figure 2:
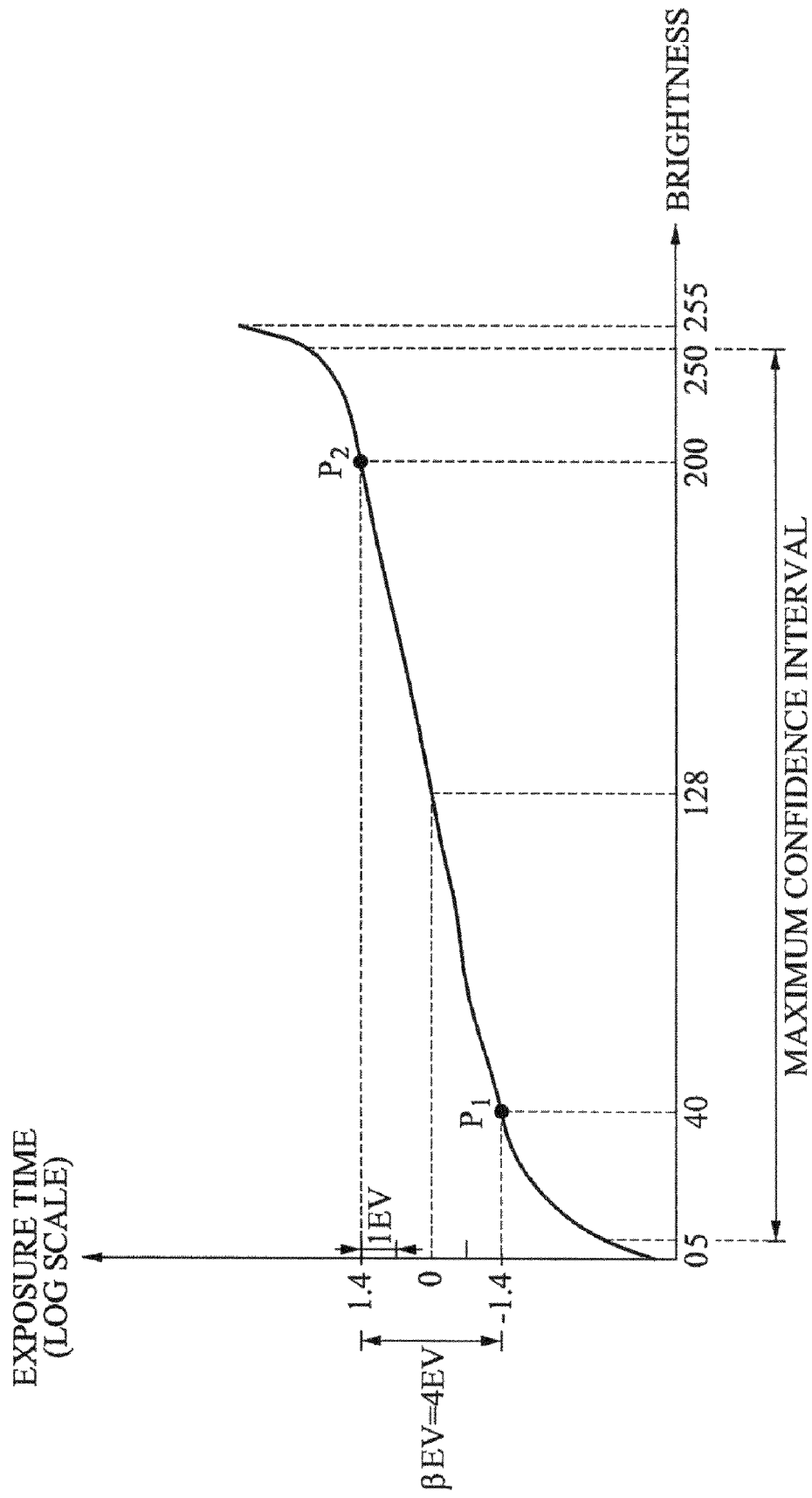
FIG. 2 illustrates an example of a response function of a digital photographing device according to an embodiment.

FIG. 2 illustrates an example of a response function of a digital photographing device according to an embodiment.

The response function may be calculated using a technology disclosed in "recovering high dynamic range radiance maps from photographs" prepared by Paul E. Debevec and Jitendra Malik, SIGGRAPH, in 1997. In a graph of FIG. 2, a horizontal axis denotes a brightness level or a saturation level, and a vertical axis expresses, as a log scale, an exposure time utilized for image photographing.

When an input image corresponds to an RGB image, the response function may be calculated with respect to each of an R image, a G image, and a B image. The response function may be changed based on a characteristic of the digital photographing device.

A designer may determine, as the confidence interval, an interval that is determined to accurately estimate an actual brightness of an image, that is, radiance from the response function. Referring to FIG. 2, a pixel having a brightness of zero and 255 may not be accurately estimated in the radiance estimation. Accordingly, it may be appropriate to exclude a portion of the confidence interval around zero and 255 from the confidence interval.

The designer may include, in the confidence interval, an interval guaranteeing a linear characteristic of the response function. In FIG. 2, a linear interval may indicate an interval corresponding to a brightness of 40 through 200. Accordingly, the designer may determine, as the linear interval having a minimum (relatively low) brightness, the interval corresponding to the brightness of 40 through 200. For example, the designer may set, as the confidence interval, an interval corresponding to a brightness of 5 through 250 in an 8-bit image.

When the confidence interval is set, the designer may set, as an optimal exposure value βEV, a difference between exposures times corresponding to two points of the linear interval in the response function. The optimal exposure value βEV denotes a value utilized to minimize a number of re-photographing operations and to generate an HDR image closest to an original image. For example, a difference between exposure times corresponding to a start point $P_1$ and an end point $P_2$ of the linear interval may be set as the optimal exposure value βEV.

Referring to FIG. 2, the exposure times corresponding to the start point $P_1$ and the end point $P_2$ of the linear interval correspond to −1.4 and +1.4, respectively. An actual difference between the two exposure times may be 4EV. However, it is only an example and thus various types of examples may be applicable.

The confidence interval and the optimal exposure value βEV determined through the above process may be set in the multi-exposure controlling apparatus 100.

Referring again to FIG. 1, the exposure control unit 130 may set an initial exposure time for multi-exposure photographing based on a comparison result between a predetermined confidence interval and an average high brightness calculated based on a current histogram. The calculated average high brightness may correspond to an average high brightness set by the first calculator 120.

Specifically, the exposure control unit 130 may set the initial exposure time by controlling an exposure so that the calculated average high brightness may be included in the confidence interval. The exposure control unit 130 may set, as the initial exposure time, an exposure time of when the calculated average high brightness is closest to an intermediate brightness of the confidence interval. For example, since the 8-bit image has the brightness level of zero through 255, the intermediate brightness is 128. Accordingly, the exposure control unit 130 may set, as the initial exposure time, the exposure time of when the calculated average high brightness is close to 128.

When the current histogram includes a histogram of an R channel image, a histogram of a G channel image, and a histogram of a B channel image, the first calculator 120 may calculate the average high brightness from each histogram through the above process. The first calculator 120 may set, as the initial exposure time, the exposure time of when a greatest (relatively great) average high brightness among the three calculated average high brightness is included in the confidence interval.

When a subject is photographed using the set initial exposure time, an obtained first image may be stored in a storage unit (FIG. 4) and the exposure control unit 130 may increase the initial exposure time by a set exposure value βEV. Accordingly, the subject may be re-photographed using the increased exposure time=initial exposure time+βEV.

When the subject is re-photographed using the increased exposure time=initial exposure time+βEV, an obtained second image may be stored. The histogram generator 110 may generate a subsequent histogram and provide the subsequent histogram to the second calculator 140.

The second calculator 140 may calculate an average brightness of pixels corresponding to a low brightness area, for example, a bottom B % in the subsequent histogram obtained by photographing the subject using the set initial exposure time.

Specifically, the second calculator 140 may select, from a low brightness area of the subsequent histogram, a brightness level of pixels corresponding to a second ratio, for example, the bottom B % among all the pixels, and may calculate an average brightness of the selected pixels. The second calculator 140 may select, from the subsequent histogram, a brightness level corresponding to the bottom B %. The second calculator 140 may set the calculated average brightness as the average low brightness.

The comparison unit 150 may compare the confidence interval and the average low brightness calculated based on the subsequent histogram. The comparison unit 150 may provide the exposure control unit 130 with information regarding whether the average low brightness is included in the confidence interval.

When the subsequent histogram includes a histogram of an R channel image, a histogram of a G channel image, and a histogram of a B channel image, the second calculator 140 may calculate the average low brightness from each histogram through the above process. The comparison unit 150 may compare whether at least one of or all of the calculated three average low brightness is included in the confidence interval, and may provide the comparison result to the exposure control unit 130.

Depending on the comparison result, the exposure control unit 130 may determine whether the initial exposure time increases. For example, where the average low brightness is excluded from the confidence interval, the exposure control unit 130 may increase the initial exposure time by the set exposure value βEV. Accordingly, the subject may be re-photographed using the increased exposure time=initial exposure time+βEV.

When the calculated average low brightness is included in the confidence interval, the exposure control unit 130 may terminate a multi-exposure photographing operation. When the average low brightness is included in the confidence interval, it may indicate all the pixels are included in the confidence interval at least once, and may also indicate it is possible to estimate an image radiance.

The multi-exposure control unit apparatus 100 may be provided in an image signal processor or a digital signal processor of the digital photographing device, and may also be designed using a camera image processing program.

Hereinafter, a method of controlling multiple exposures will be described with reference to the accompanying drawings.

Figure 3:
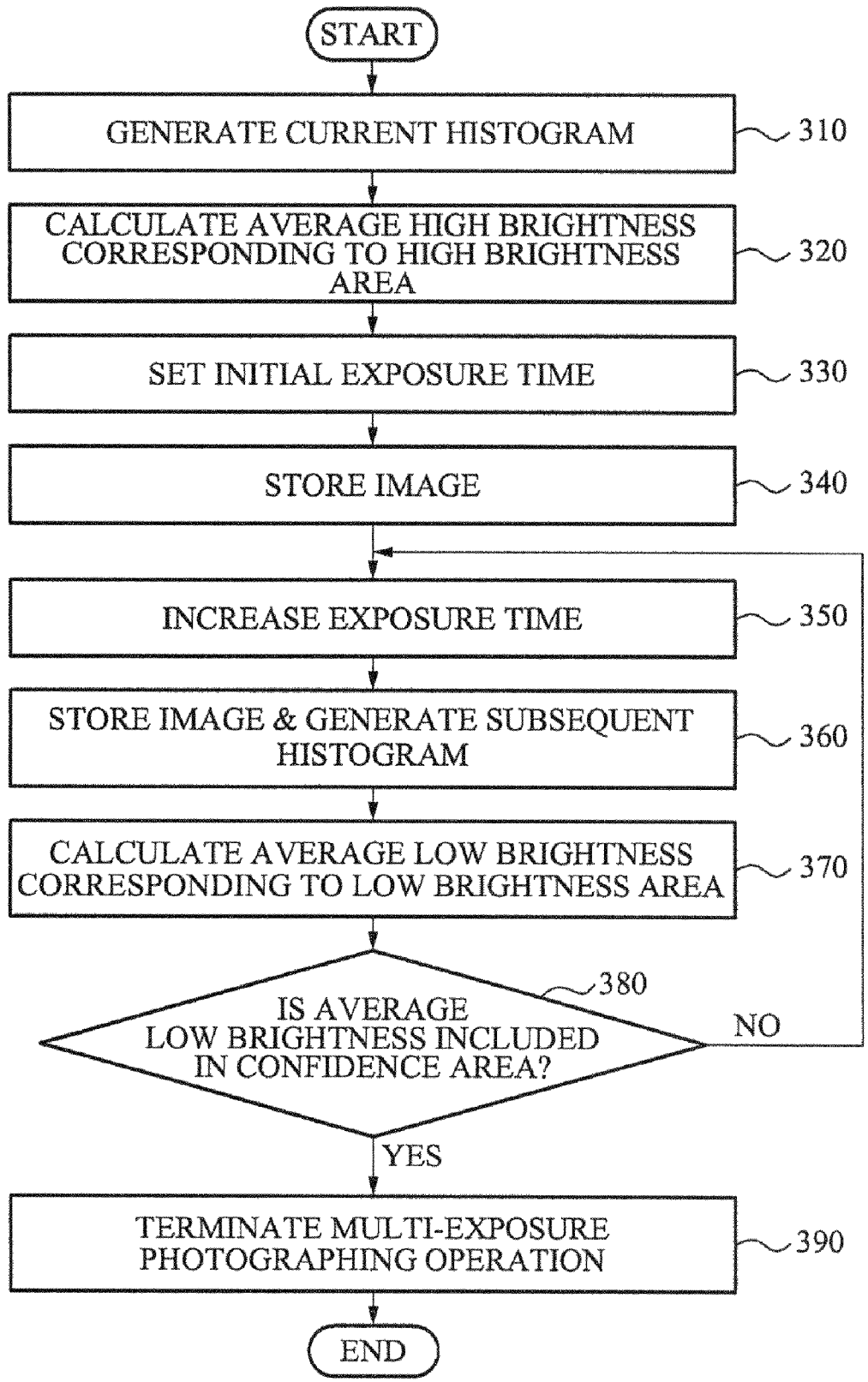
FIG. 3 illustrates a method of controlling multiple exposures according to an embodiment.

FIG. 3 illustrates a method of controlling multiple exposures according to an embodiment.

Referring to FIGS. 1 through 3, in operation 310, the histogram generator 110 may generate a current histogram with respect to at least one input image.

In operation 320, the first calculator 120 may calculate an average brightness of pixels corresponding to a high brightness area of a current histogram input from the histogram generator 110, and may set the calculated average brightness as an average high brightness. In operation 320, the first calculator 120 may verify, from the high brightness area of the current histogram, a brightness of pixels corresponding to a first ratio, for example, a top A % among all pixels, and may calculate the average brightness of the verified pixels. The high brightness area may correspond to a top brightness level of the current histogram.

In operation 330, the exposure control unit 130 may set an initial exposure time by comparing the calculated average high brightness and a confidence interval. The exposure control unit 130 may set the initial exposure time by controlling an exposure so that the average high brightness may be included in the confidence interval.

Figure 4:
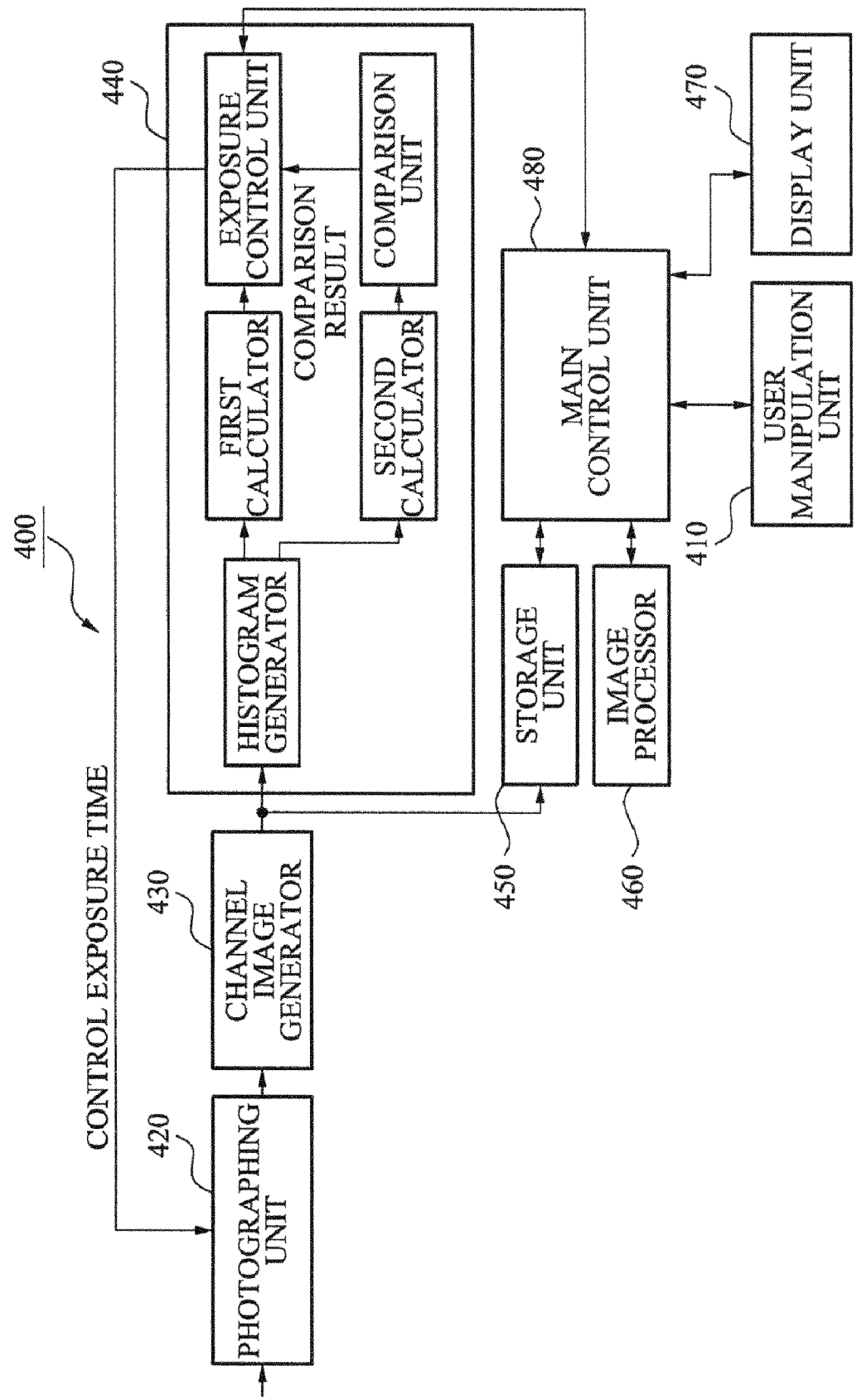
FIG. 4 illustrates a digital photographing device according to an embodiment.

In operation 340, the exposure control unit 130 may store an image obtained by photographing a subject using the set initial exposure time in a storing unit 450 (FIG. 4).

In operation 350, the exposure control unit 130 may increase the set initial exposure time by an optimal exposure value to re-photograph the subject.

In operation 360, the histogram generator 110 may store an image obtained by re-photographing the subject using the increased exposure time=initial exposure time+optimal exposure value, and generate a subsequent histogram.

In operation 370, the second calculator 140 may calculate an average brightness of pixels corresponding to a low brightness area, for example, a bottom B % of the subsequent histogram, and set the calculated average brightens as the average low brightness. The low brightness area may correspond to a bottom brightness level of the subsequent histogram.

In operation 380, the comparison unit 150 may calculate the average low brightness and the confidence interval. When the subsequent histogram includes an R histogram, a G histogram, and a B histogram, the second calculator 140 may calculate the average low brightness with respect to each of the R histogram, the G brightness, and the B histogram. The comparison unit 150 may compare whether all the three average low brightness is included in the confidence interval.

When the calculated average low brightness is excluded from the confidence interval in operation 380, the exposure control unit 130 may perform operation 350. The exposure control unit 130 may further increase the exposure time by a set exposure value. Accordingly, the subject may be re-photographed using the increased exposure time (=initial exposure time+2×exposure value).

Conversely, when the calculated average low brightness is included in the confidence interval in operation 380, the exposure control unit 130 may terminate a multi-exposure photographing operation. Accordingly, it is possible to estimate all the image radiances using a minimum number (relatively low number) of photographing operations.

FIG. 4 illustrates a digital photographing device 400 according to an embodiment.

Referring to FIG. 4, the digital photographing device 400 may include a user manipulation unit 410, a photographing unit 420, a channel image generator 430, a multi-exposure processor 440, a storage unit 450, an image processor 460, a display unit 470, and a main control unit 480.

The user manipulation unit 410 indicates a user interface, and may include various types of buttons, for example, a power button, a direction button, a shutter-release button open during an exposure time, a zooming button, a touch screen, and the like. The shutter-release button may open or close a shutter to control an exposure of an image sensor or a film to light during the exposure time set by the exposure control unit 130. The shutter-release button may control the shutter to appropriately expose a subject to the light in interoperation with a diaphragm to store an image in the storage unit 450.

The photographing unit 420 may photograph the subject to output an image in an RGB format, and may include, for example, a shutter, an optical lens, a diaphragm, and an image sensor such as a charge coupled device (CCD), and an analog-to-digital converter (ADC). The image output from the image sensor may include, for example, a bayer image.

The channel image generator 430 may separately generate the input (bayer) image into an R channel image, a G channel image, and a B channel image. The channel image generator 430 may be a processor to perform a color filter array (CFA) interpolation.

The multi-exposure processor 440 corresponds to the multi-exposure controlling apparatus 100 of FIG. 1 and thus further detailed description will be omitted here. When the user manipulation unit 410 selects a multi-exposure photographing mode, the multi-exposure processor 440 may generate an R histogram, a G histogram, and a B histogram corresponding to the R channel image, the G channel image, and the B channel input, respectively, that are input from the channel image generator 430.

The multi-exposure processor 440 may calculate an average high brightness from each of the R histogram, the G histogram, and the B histogram using the above method, and may retrieve an exposure time of when a greatest (or relatively great) average high brightness among the calculated three high brightness averages may be included in a confidence interval. The retrieved exposure time may be set as a minimum exposure time.

The main control unit 480 may control the multiple processor 440 to photograph the subject using the minimum (relatively low) exposure time, and to store an obtained image in a storage unit 450. The multi-exposure processor 440 may re-photograph the subject by increasing the exposure time by an optimal exposure value. An image obtained by increasing the exposure time may be stored in the storage unit 450.

The multi-exposure processor 440 may calculate an average low brightness from each of the R histogram, the G histogram, and the B histogram of the image obtained through the re-photographing operation. When all the calculated average low brightness is included in the confidence interval, the multi-exposure processor 440 may terminate a multi-exposure photographing operation. When at least one of the calculated three average low brightnesses is excluded from the confidence interval, the multi-exposure processor 440 may re-photograph the subject by further increasing the exposure time by the optimal exposure value.

Specifically, until the average low brightnesses calculated from the histogram of the image are included in the confidence interval, the multi-exposure processor 440 may repeatedly photograph the subject by increasing the exposure time.

The storage unit 450 may store channel images generated by the channel image generator 430. In particular, in the multi-exposure photographing mode, the storage unit 450 may store the channel images obtained by photographing the subject using each exposure time. The each exposure time may indicate the initial exposure time and the exposure time increased by an optimal exposure value.

The storage unit 450 may also store an optimal exposure value and a confidence interval of a response function set in a test operation.

The image processor 460 may perform radiance mapping and tone mapping with respect to RGB channel images for each exposure time that are stored in the storage unit 450. The image processor 460 may obtain dynamic range information from the image obtained through the photographing operation, and generate a radiance map to estimate a radiance of pixels constituting the image. The image processor 460 may perform tone mapping to convert the radiance map to an 8-bit HDR frame.

The display unit 470 may display the image obtained through the above multi-exposure photographing operation.

The main control unit 480 may control the above constituent components using a control program, an application program, and the like. For example, when the multi-exposure photographing mode is selected, the main control unit 480 may control the multi-exposure processor 440 to adjust the initial exposure time and to output the HDR image based on a minimum (relatively low) number of images using the optimal exposure value.

Figure 5:
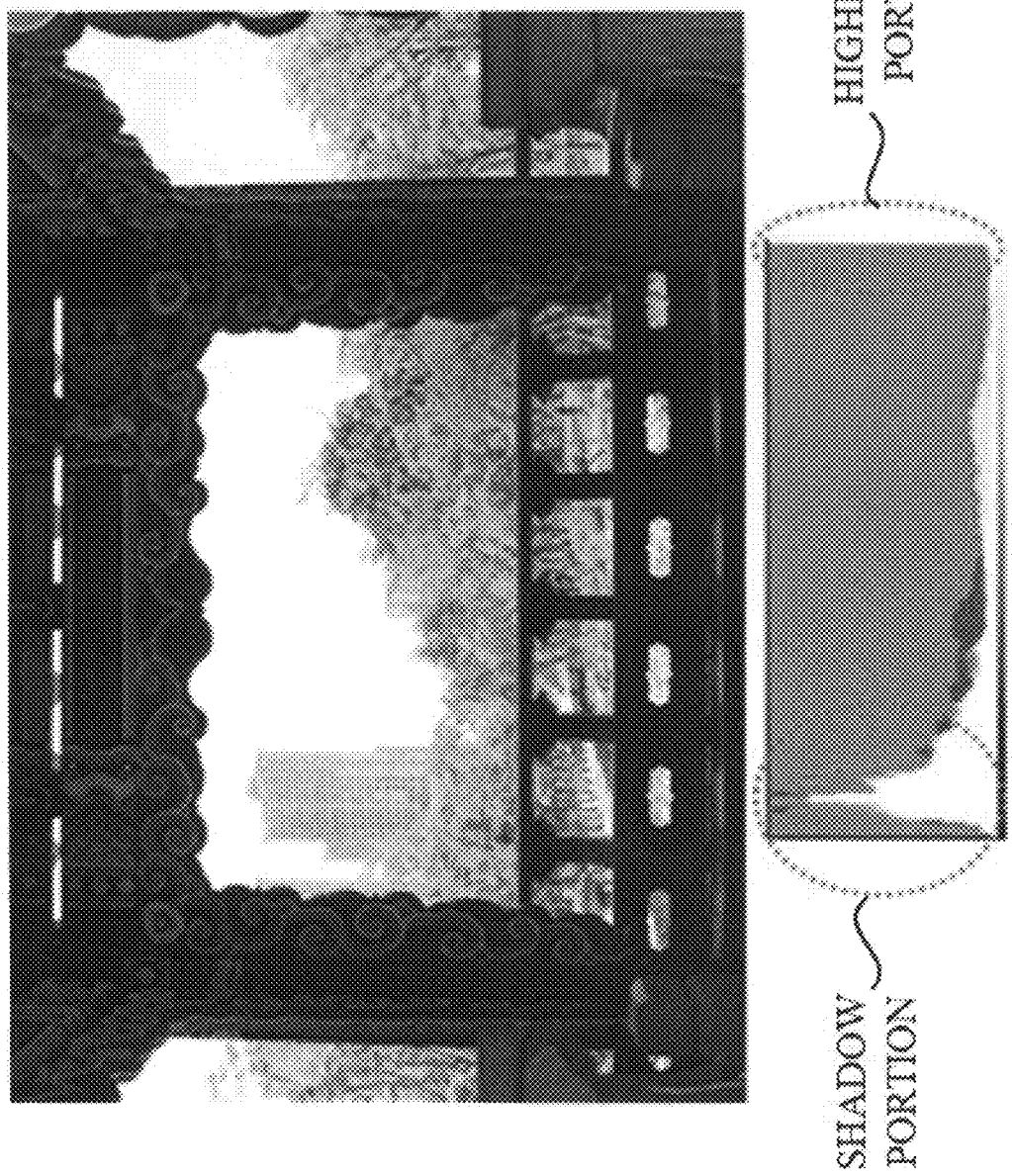
FIG. 5 illustrates an image obtained by photographing a high contrast scene having a high dynamic range (HDR) at an automatic exposure, and a red, green, blue (RGB) histogram with respect to the image according to an embodiment.

FIG. 5 illustrates an image obtained by photographing a high contrast scene having an HDR at an automatic exposure, and a RGB histogram with respect to the image according to an embodiment. Referring to the RGB histogram, most pixels constituting the scene are concentrated on a shadow portion and a highlight portion. To generate an HDR image with respect to the scene, the scene may be photographed with an increasing exposure time by doubling each exposure time from an exposure time of when an image becomes completely dark to an exposure time of when an image becomes completely white.

Figure 6:
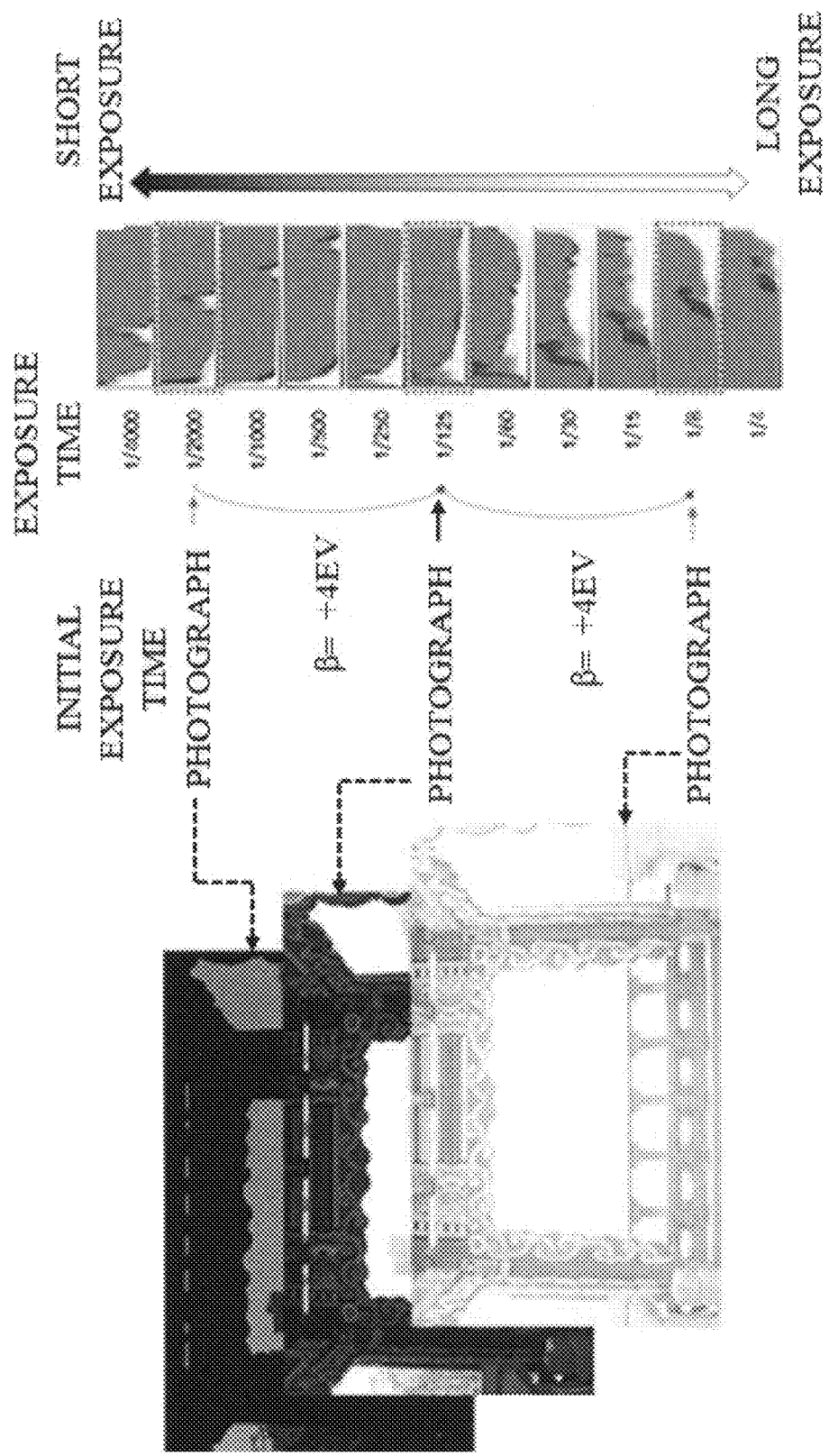
FIG. 6 illustrates an RGB histogram for each exposure time when the exposure time increases by each twice, and when the exposure time increases according to an embodiment.

FIG. 6 illustrates an RGB histogram for each exposure time when the exposure time increases by each twice, and when the exposure time increases according to an embodiment. Specifically, when an existing technology is employed, a minimum of 11 images may be utilized to generate an HDR image.

According to an embodiment, the HDR image may be obtained using three photographing operations among 11 RGB histograms shown in FIG. 6. Specifically, the HDR image may be generated by photographing the scene three times using ½000 of a minimum exposure time, ½50 of an exposure time increased by the optimal exposure value, and ⅛ of an exposure time increased by another optimal exposure value.

Figure 7:
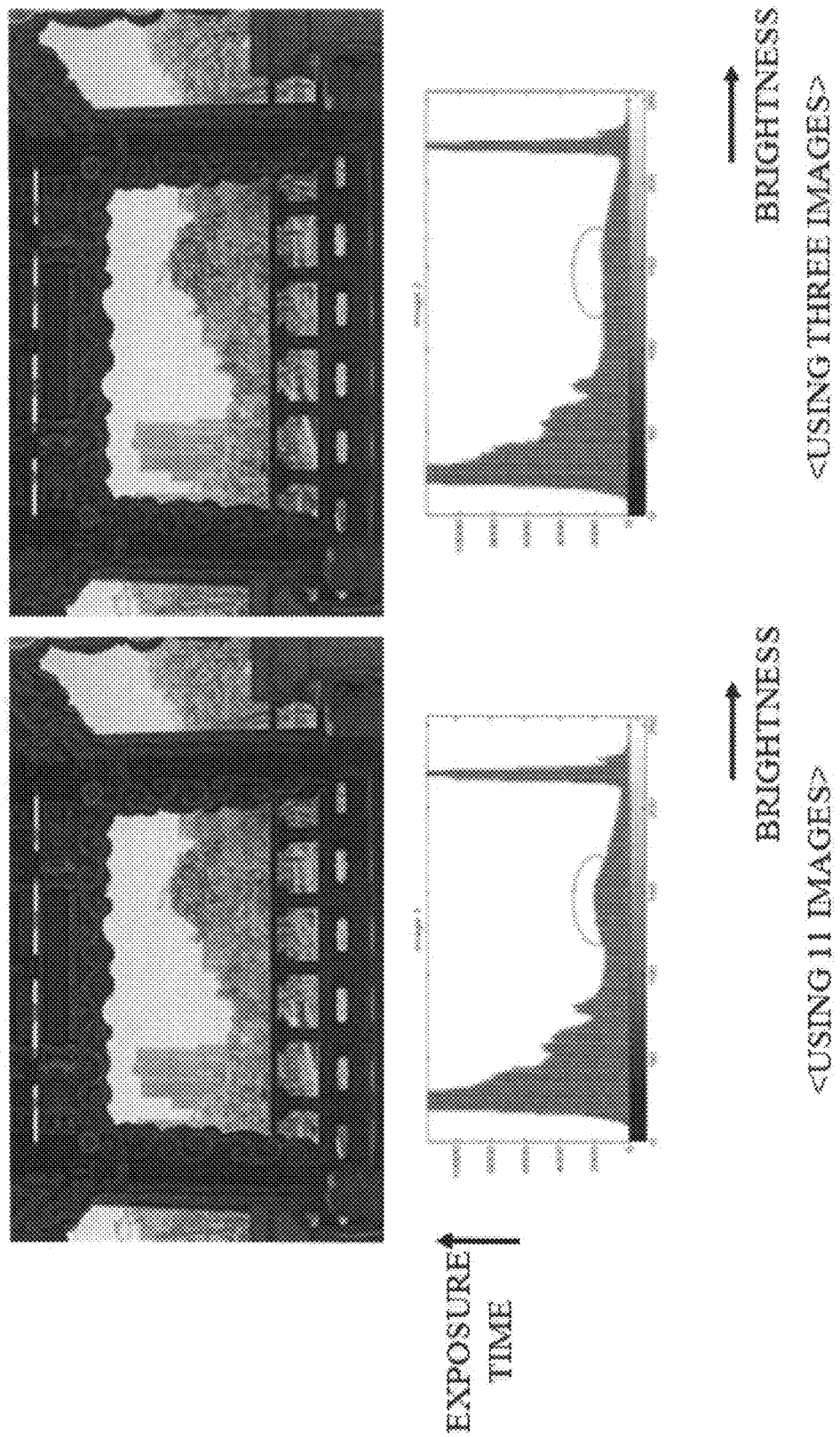
FIG. 7 illustrates HDR images generated based on a result of FIG. 6 and histogram of the HDR images.

It can be known from FIG. 7 that the HDR image generated using 11 images according to the existing method is nearly the same as the HDR image generated using three images according to an embodiment. Referring to FIG. 7, compared to FIG. 5, pixels are not concentrated on a shadow portion and a highlight portion, and a blue color area corresponding to the sky is clearly expressed.

As described above, according to an embodiment, when a multi-exposure photographing is performed, a HDR image with a high performance may be obtained using a minimum number (or relatively low number) of images.

According to an embodiment, it is possible to set an optimal exposure change unit and a confidence interval of an RGB channel based on a response function of a digital photographing device. Accordingly, a radiance of all the pixels may be estimated using only a minimum number of images.

Also, according to an embodiment, it is possible to analyze an RGB histogram, and to determine a start point and an end point of an exposure time for a minimum number (or relatively low number) of multi-exposure photographing operations. The exposure time may be determined based on a further simple calculation by using a set optimal exposure change unit and a confidence interval.

Accordingly, it is possible to decrease a number of images utilized to generate an HDR image, and to enhance an inefficiency and a phenomenon caused by a motion of a subject occurring due to a long period of photographing operation. The HDR image obtained according to an embodiment may be nearly the same as an HDR image obtained by using tens of images according to an existing method.

Also, according to an embodiment, an image sensor may not be changed to obtain an HDR image.

Also, according to an embodiment, it is possible to store images in a memory storage efficiently by reducing a number of images utilized to generate an HDR image.

The multi-exposure controlling method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. An apparatus for controlling multiple exposures, the apparatus comprising:
    an exposure control unit to set an initial exposure time based on a comparison result between a predetermined brightness confidence interval and an average high brightness that is calculated based on at least one current histogram; and
    a comparison unit to compare the predetermined brightness confidence interval and an average low brightness that is calculated based on a subsequent histogram obtained by photographing a subject using the set initial exposure time,
    wherein the exposure control unit changes the initial exposure time based on a comparison result of the comparison unit.

2. The apparatus of claim 1, wherein, when the average low brightness is excluded from the predetermined brightness confidence interval, the exposure control unit increases an exposure time by a set exposure value to re-photograph the subject.

3. The apparatus of claim 1, wherein the predetermined brightness confidence interval is selected from a response function that is a relationship function between a brightness of at least one pixel and an exposure time.

4. The apparatus of claim 3, wherein the predetermined brightness confidence interval includes a linear interval of the response function.

5. The apparatus of claim 4, wherein a difference between exposure times corresponding to both ends of the linear interval indicates an exposure value.

6. The apparatus of claim 1, wherein, when the average low brightness is included in the predetermined brightness confidence interval, the exposure control unit terminates a multi-exposure photographing operation.

7. The apparatus of claim 1, further comprising:
a first calculator to calculate an average brightness of pixels corresponding to a high brightness area in the at least one current histogram, and to set the calculated average brightness as the average high brightness; and
a second calculator to calculate an average brightness of pixels corresponding to a low brightness area in the subsequent histogram, and to set the calculated average brightness as the average low brightness.

8. The apparatus of claim 7, wherein:
the first calculator selects, from the high brightness area, a brightness level of pixels corresponding to a first ratio among all pixels, and calculates an average brightness of the pixels, and
the second calculator selects, from the low brightness area, a brightness level of pixels corresponding to a second ratio among all the pixels, and calculates an average brightness of the pixels.

9. The apparatus of claim 7, wherein the exposure control unit sets the initial exposure time by controlling an exposure so that the average high brightness is included in the brightness confidence interval.

10. The apparatus of claim 9, wherein the exposure control unit sets, as the initial exposure time, an exposure time of when the average high brightness is closest or relatively closer to an intermediate brightness of the brightness confidence interval.

11. The apparatus of claim 1, wherein, when the at least one current histogram includes a histogram with respect to a red (R) channel, a histogram with respect to a green (G) channel, and a histogram with respect to a blue (B) channel, the exposure control unit compares the brightness confidence interval and a greatest or relatively great average high brightness among high brightness averages calculated based on the histograms of the R channel, the G channel, and the B channel.

12. A method of controlling multiple exposures for an image photographing apparatus, the method comprising:
setting an initial exposure time using an exposure control unit based on a comparison result between a predetermined brightness confidence interval and an average high brightness that is calculated based on at least one current histogram;
comparing the brightness confidence interval and an average low brightness that is calculated based on a subsequent histogram obtained by photographing a subject using the set initial exposure time using a comparison unit; and
changing the initial exposure time of the image photographing apparatus based on a comparison result using the exposure control unit.

13. The method of claim 12, wherein, when the average low brightness is excluded from the brightness confidence interval, the changing comprises increasing an exposure time by a set exposure value to re-photograph the subject.

14. The method of claim 12, wherein the brightness confidence interval is selected from a response function that is a relationship function between a brightness of at least one pixel and an exposure time.

15. The method of claim 14, wherein the brightness confidence interval includes a linear interval of the response function.

16. The method of claim 15, wherein a difference between exposure times corresponding to both ends of the linear interval indicates an exposure value.

17. The method of claim 12, further comprising:
terminating a multi-exposure photographing operation when the average low brightness is included in the brightness confidence interval.

18. The method of claim 12, further comprising:
calculating an average brightness of pixels corresponding to a high brightness area in the at least one current histogram to set the calculated average brightness as the average high brightness; and
calculating an average brightness of pixels corresponding to a low brightness area in the subsequent histogram to set the calculated average brightness as the average low brightness.

19. The method of claim 18, wherein:
the calculating and the setting the average high brightness comprises selecting, from the high brightness area, a brightness level of pixels corresponding to a first ratio among all pixels, and calculating an average brightness of the selected pixels, and
the calculating and the setting the average low brightness comprises selecting, from the low brightness area, a brightness level of pixels corresponding to a second ratio among all the pixels, and calculating an average brightness of the selected pixels.

20. The method of claim 18, wherein the setting of the initial exposure time comprises setting the initial exposure time by controlling an exposure so that the average high brightness is included in the brightness confidence interval.

21. The method of claim 20, wherein the setting of the initial exposure time comprises setting, as the initial exposure time, an exposure time of when the average high brightness is closest or relatively close to an intermediate brightness of the predetermined brightness confidence interval.

22. The method of claim 12, wherein, when the at least one current histogram includes a histogram with respect to an R channel, a histogram with respect to a G channel, and a histogram with respect to a B channel, the setting of the initial exposure time comprises comparing the brightness confidence interval and a greatest or relatively great average high brightness among high brightness averages calculated based on the histogram of the R channel, the G channel, and the B channel.

23. A non-transitory computer-readable recording medium storing a program to implement the method of claim 12.

24. Apparatus for controlling multiple exposures comprising:
a photographing unit to take an image from a charge coupled device;
an image channel generator to separately generate the image from the photographing unit into an R channel image, a G channel image, and a B channel image;
a multiple exposure control unit to control an exposure time by comparing a brightness confidence interval and an average high brightness and an average low brightness to take an image;
a storage unit to store the image;
a main control unit to control the multiple exposure control unit to adjust the exposure time;
a user manipulation unit to receive a command from a user; and
a storage unit to store the taken image.

* * * * *

UNITED STATES PATENT AND TRADEMARK OFFICE
CERTIFICATE OF CORRECTION

| | |
|---|---|
| PATENT NO. | : 8,305,487 B2 |
| APPLICATION NO. | : 12/662438 |
| DATED | : November 6, 2012 |
| INVENTOR(S) | : Joon Hyuk Cha et al. |

It is certified that error appears in the above-identified patent and that said Letters Patent is hereby corrected as shown below:

In the Claims:

Column 12, Line 43, In Claim 22, delete "histogram" and insert -- histograms --, therefor.

Signed and Sealed this
Fourteenth Day of May, 2013

Teresa Stanek Rea
*Acting Director of the United States Patent and Trademark Office*